US011240052B2

(12) United States Patent
Silva et al.

(10) Patent No.: US 11,240,052 B2
(45) Date of Patent: Feb. 1, 2022

(54) FACILITATING COMMUNICATION IN A COLLABORATIVE ENVIRONMENT

(71) Applicant: International Business Machines Corporation, Armonk, NY (US)

(72) Inventors: Asima Silva, Holden, MA (US); John Rice, Waterford (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/011,980

(22) Filed: Jun. 19, 2018

(65) Prior Publication Data

US 2019/0386842 A1 Dec. 19, 2019

(51) Int. Cl.
*H04L 12/18* (2006.01)
*H04L 12/58* (2006.01)

(52) U.S. Cl.
CPC ...... *H04L 12/1831* (2013.01); *H04L 12/1822* (2013.01); *H04L 51/046* (2013.01); *H04L 51/14* (2013.01)

(58) Field of Classification Search
CPC . H04L 12/1818; H04L 63/104; H04L 65/403; H04L 65/4038; H04L 12/1813; H04L 51/12; H04L 51/14; H04L 67/1044; H04L 51/04; H04L 51/16; H04L 51/32; H04L 51/26; H04L 12/185; G06F 16/24578; G06F 16/288; G06F 16/335;

(Continued)

(56) References Cited

U.S. PATENT DOCUMENTS 6,938,068 B1 * 8/2005 Kraft ............... G06Q 10/10
709/203
7,668,918 B2 * 2/2010 Diddee ............ H04L 51/04
709/206

(Continued)

OTHER PUBLICATIONS

Mehdi Kargar, Aijun An, CIKM '11: Proceedings of the 20th ACM international conference on Information and knowledge management, Oct. 2011, pp. 985-994, https://doi.org/10.1145/2063576.2063718 (Year: 2011).*

(Continued)

*Primary Examiner* — Kamal B Divecha
*Assistant Examiner* — Alex H. Tran
(74) *Attorney, Agent, or Firm* — Anthony M. Pallone

(57) ABSTRACT

Embodiments generally relate to facilitating communication in a collaboration environment. In some embodiments, a method includes receiving a message in a collaboration environment. The method further includes determining a group of users based on text in the message, where one or more key words in the text indicate the group of users. The method further includes obtaining a collaboration history associated with the group of users, where the collaboration history includes collaboration statistics. The method further includes determining a subgroup of users from the group of users based on the collaboration statistics, where the collaboration statistics indicate a level of collaboration activity that meets one or more predetermined collaboration requirements. The method further includes sending notifications to users in the subgroup of users, where the notifications invite the users of the subgroup to respond to the message.

15 Claims, 5 Drawing Sheets

(58) Field of Classification Search
CPC ............ G06F 16/3329; G06F 3/04817; G06F 3/0486; G06F 3/04845; G06F 16/9535; G06F 21/36; G06F 16/435; H04W 4/08; H04W 4/21; H04W 4112/1822; G06Q 10/103; G06Q 10/063112

See application file for complete search history.

(56) References Cited

U.S. PATENT DOCUMENTS

| | | | |
|---|---|---|---|
| 8,103,726 B2 | 1/2012 | Stoddard et al. | |
| 8,712,944 B1* | 4/2014 | Kim | G06Q 50/01 706/45 |
| 9,026,921 B2 | 5/2015 | Shi et al. | |
| 10,270,720 B2* | 4/2019 | Wang | H04L 51/08 |
| 10,579,667 B2* | 3/2020 | Cao | G06F 16/24578 |
| 2008/0097817 A1* | 4/2008 | Solaru | G06Q 10/06311 705/7.13 |
| 2010/0138492 A1* | 6/2010 | Guzman | H04L 12/1818 709/204 |
| 2010/0205541 A1* | 8/2010 | Rapaport | G06F 16/285 715/753 |
| 2011/0161279 A1* | 6/2011 | Rao | H04L 67/306 706/52 |
| 2012/0023397 A1* | 1/2012 | Leichtberg | G06F 3/0482 715/234 |
| 2013/0018960 A1* | 1/2013 | Knysz | H04L 65/403 709/204 |
| 2013/0263020 A1* | 10/2013 | Heiferman | H04L 12/1818 715/753 |
| 2014/0032670 A1* | 1/2014 | Ellingson | H04L 65/403 709/204 |
| 2014/0067826 A1* | 3/2014 | Jackson | G06F 16/337 707/748 |
| 2014/0067967 A1* | 3/2014 | Jackson | G06Q 30/0269 709/206 |
| 2014/0082000 A1* | 3/2014 | Abuelsaad | G06Q 50/01 707/755 |
| 2014/0137003 A1* | 5/2014 | Peters | G06Q 10/107 715/758 |
| 2014/0304254 A1* | 10/2014 | Rubinstein | G06F 16/24578 707/722 |
| 2015/0019273 A1* | 1/2015 | Grosz | G06Q 50/01 705/5 |
| 2015/0089399 A1* | 3/2015 | Megill | G06Q 30/0203 715/753 |
| 2015/0120717 A1* | 4/2015 | Kim | G06F 16/335 707/727 |
| 2015/0120718 A1* | 4/2015 | Luo | G06F 16/335 707/728 |
| 2015/0120847 A1* | 4/2015 | Bourassa | H04L 51/14 709/206 |
| 2015/0326625 A1* | 11/2015 | Rosenberg | H04L 65/403 715/753 |
| 2015/0350258 A1* | 12/2015 | Griffin | H04N 7/15 348/14.08 |
| 2015/0363403 A1* | 12/2015 | Khalatov | G06Q 10/107 707/723 |
| 2016/0308920 A1* | 10/2016 | Brunsch | H04L 67/24 |
| 2016/0321597 A1* | 11/2016 | McCormack | G06Q 10/063112 |
| 2017/0163751 A1* | 6/2017 | Allan | G06F 16/3329 |
| 2017/0180276 A1* | 6/2017 | Gershony | H04L 51/16 |
| 2017/0277424 A1* | 9/2017 | Witkowski | G06Q 30/0251 |
| 2017/0371951 A1 | 12/2017 | Ristock et al. | |
| 2018/0007100 A1* | 1/2018 | Krasadakis | G06Q 10/1095 |
| 2018/0075413 A1* | 3/2018 | Culver | G06Q 10/103 |
| 2018/0314976 A1* | 11/2018 | Miao | G06N 5/046 |
| 2019/0052720 A1* | 2/2019 | Guo | G06F 3/0483 |
| 2019/0173968 A1* | 6/2019 | Yue | H04L 67/26 |

OTHER PUBLICATIONS

C. Sapateiro, N. Baloian, P. Antunes and G. Zurita, "Developing collaborative peer-to-peer applications on mobile devices," 2009 13th International Conference on Computer Supported Cooperative Work in Design, 2009, pp. 396-401, doi: 10.1109/CSCWD.2009. 4968091 (Year: 2009).*

Watson, "AlchemyLanguage", IBM Watson Developer Cloud, https://www.ibm.com/watson/developercloud/alchemy-language.html, [retrieved May 12, 2018].

* cited by examiner

| Topic | Computer Monitor |
|---|---|
| Classification | Support |
| Likely Users | User1, User23, and User 67 |
| Collaboration Strength of Likely Users | 96% |
| Sources checked | RTC repository, Stack Exchange, Gmail |
| Access Control | User 23 is primary |
| Recommendation | User 23 then User 67 |
| Initial Introduction | "I see you guys work really well together..." |
| Best Collaboration Time | 8am-11am |

FACILITATING COMMUNICATION IN A COLLABORATIVE ENVIRONMENT

BACKGROUND

Collaborative applications provide a way for two or more individuals to communicate electronically. These applications use a workspace of channels to organize content, and everyone on those channels may have the same level of visibility and exposure to the content whether or not they are interested in the content. However, these applications have various drawbacks. For example, finding the correct colleague to help with an issue can be difficult. Typically, a user creates an address book of other users and remembers who would be best suited to contact for particular areas, products, and issues. This is time consuming. Many companies have an email address that forwards an email to everyone in a department. For example, if a user is looking for support for their laptop, they might us laptopsupport@examplecompany.com. This is not efficient, as a person who is best suited to help might not respond if that person receives too many emails from different users requesting help. In a large community of users, emails can quickly get lost among other emails. Consequently, users may expend excessive amounts of time finding help, which negatively impacts the productivity of users and overall organizations.

SUMMARY

Disclosed herein is a method for facilitating communication in a collaboration environment, and a system and computer program product as specified in the independent claims. Embodiments are given in the dependent claims. Embodiments can be freely combined with each other if they are not mutually exclusive.

Embodiments generally facilitate communication in a collaboration environment. In some embodiments, a method includes receiving a message in a collaboration environment. The method further includes determining a group of users based on text in the message, where one or more key words in the text indicate the group of users. The method further includes obtaining a collaboration history associated with the group of users, where the collaboration history includes collaboration statistics. The method further includes determining a subgroup of users from the group of users based on the collaboration statistics, where the collaboration statistics indicate a level of collaboration activity that meets one or more predetermined collaboration requirements. The method further includes sending notifications to users in the subgroup of users, where the notifications invite the users of the subgroup to respond to the message.

In another embodiment, the one or more key words indicate a topic, wherein users in the group of users have expertise on the topic. In another aspect, the predetermined collaboration requirements require that the collaboration statistics indicate that the users in the subgroup interact well together. In another aspect, the predetermined collaboration requirements require that the collaboration statistics indicate that historic participation of the users in the subgroup results in positive collaboration activity. In another aspect, the predetermined collaboration requirements require that the collaboration statistics indicate that historic participation of the users in the subgroup results in increased collaboration activity. In another aspect, the at least one processor further performs operations including: determining a notification priority based at least in part on the collaboration statistics; and sending the notification to the users in the subgroup in an order that is based at least in part on the notification priority. In another aspect, the at least one processor further performs operations comprising changing at least some of the users in the subgroup based at least in part on one or more collaboration requirements.

BRIEF DESCRIPTION OF THE DRAWINGS

FIG. 4 is a table showing example collaboration information, according to some embodiments.

DETAILED DESCRIPTION

Embodiments described herein facilitate communication in a collaboration environment. As described in more detail herein, a system ascertains to whom a specific message requesting assistance on a given topic should be sent. The system analyzes the message and a potential community of users and cognitively determines a collaboration subgroup of people known to work well together on the topic.

In some embodiments, a system receives a message in a collaboration environment. The system further determines a group of users suitable to respond to the message based on text in the message, where one or more key words in the text indicate the group of users. The system further obtains a collaboration history associated with the group of users, where the collaboration history includes collaboration statistics. For example, the collaboration history may include forum posts, previous message or email chains, email domains, user information, etc. The system further determines a subgroup of users from the group of users based on the collaboration statistics, where the collaboration statistics indicate a level of collaboration activity that meets one or more predetermined collaboration requirements. The collaboration statistics indicate that the subgroup of users is best suited to respond to the message and to provide assistance. The system further sends notifications to users in the subgroup of users, where the notifications invite the users of the subgroup to respond to the message.

Figure 1:
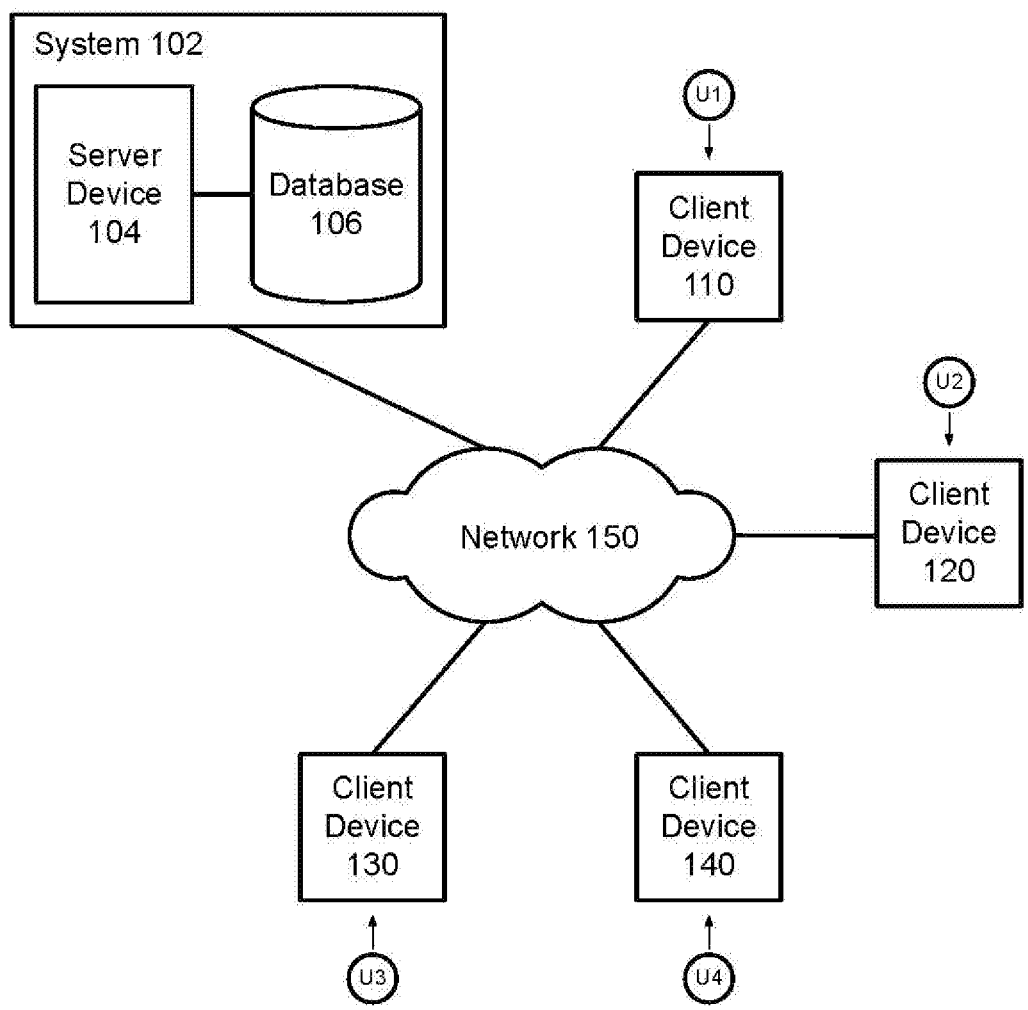
FIG. 1 is an example collaboration environment, according to some embodiments.

FIG. 1 is an example collaboration environment 100, according to some embodiments. Shown is a system 102, which includes a server device 104 and a database 106. In various embodiments, system 102 and client devices 110, 120, 130, and 140 may communicate with each other via wired and/or wireless connections associated with any suitable network such as network 150 or combination of networks.

In various embodiments, system 102 provides a collaborative or collaboration environment or workspace where two or more individuals communicate and collaborate electronically. The terms collaborative environment and collaboration environment may be used interchangeably. System 102 provides a collaboration environment or workspace that includes multiple communication channels that enable users to communicate with each other on various topics. As indicated above, each communication channel may be a group chat, a thread in a forum, a space for uploading and accessing documents, etc. Each communication channel is associated with a different topic, and users on those channels collaborate via the respective communication channels. Users may post content and messages on the various communication channels. System 102 enables users to organize the content and messages on the communication channels.

In various scenarios, a user may need assistance on a particular topic (e.g., trouble shooting a product, etc.). As such, the user may send a message to system 102 requesting assistance. System 102 ascertains an optimized subgroup of recipients to deliver the message to in order to achieve the quickest and best collaboration/interaction response for the user requesting assistance. As described in more detail herein, the system determines that this subgroup works well together on the particular topic. Further example embodiments and operations are described in more detail herein.

While server 102 performs embodiments described herein, in other embodiments, any suitable component or combination of components associated with the server 102 or any suitable processor or processors associated with server 102 may facilitate performing the embodiments described herein. In various embodiments, environment 100 may not have all of the components shown and/or may have other elements including other types of components instead of, or in addition to, those shown herein.

For ease of illustration, FIG. 1 shows one block for each of system 102, server device 104, and database 106, and shows four blocks for client devices 110, 120, 130, and 140. Blocks 102, 104, and 106 may represent multiple systems, server devices, and databases. Also, there may be any number of client devices. In other implementations, environment 100 may not have all of the components shown and/or may have other elements including other types of elements instead of, or in addition to, those shown herein. In various implementations, users U1, U2, U3, and U4 may interact with each other in the collaboration environment and/or interact with system 102 using respective client devices 110, 120, 130, and 140. In other implementations, there may be two to any number of users in the collaboration environment and/or interacting with system 102.

Figure 2:
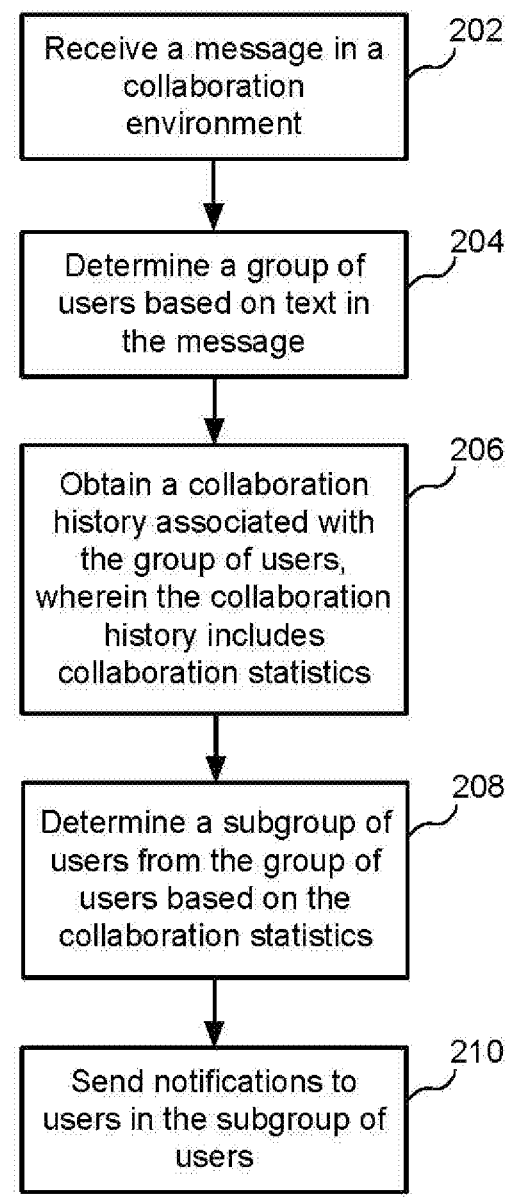
FIG. 2 is an example flow diagram for facilitating communication in a collaboration environment, according to some embodiments.

FIG. 2 is an example flow diagram for facilitating communication in a collaboration environment, according to some embodiments. Referring to both FIGS. 1 and 2, a method begins at block 202, where a system such as system 102 receives a message in a collaboration environment. The message may be received directly from a user or may be received via one or more repositories of messages. The following describes components of the system that may perform the steps of FIG. 2, as well as perform other embodiments described herein. In various embodiments, messages include communication exchanges between two or more users, and such messages may be in various forms. For example, messages may be in the form of an email conversation, an email string of messages, text messages, chat conversation of messages, etc. The term "conversation" may refer to emails, texts, and/or chats.

Figure 3:
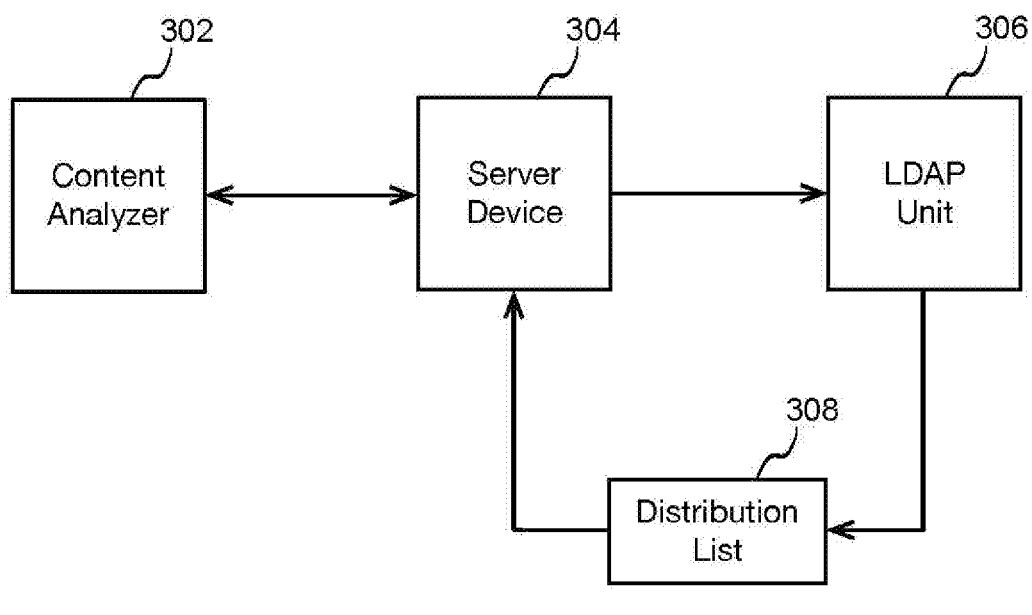
FIG. 3 is an example block diagram of components of a collaboration environment, according to some embodiments.

FIG. 3 is an example block diagram of components of a collaboration environment 300, according to some embodiments. Shown are a content analyzer 302, a server device 304, a lightweight directory access protocol (LDAP) unit 306, and a distribution list 308. In some embodiments, server device 304 may be used to implement server device 104 of FIG. 1. Also, one or more of content analyzer 302, LDAP unit 306, and distribution list 308 may reside at system 102 of FIG. 1 or may be accessible by system 102.

In some embodiments, content analyzer 302 analyzes content (e.g., text, etc.) in messages received by server device 304. In some embodiments, LDAP unit 306 is a client/server protocol used to access and manage directory information. For example, LDAP unit 306 may access expertise information associated with each user in the collaboration environment. LDAP unit 306 may access activity information (e.g., posts, frequency of posts, etc.) associated with each user in the collaboration environment. LDAP unit 306 may provide server device 304 with distribution list 308, which contains a list of candidate users for responding to messages. The system may check LDAP unit 306 or a social server in order to gather a list of recipients with appropriate expertise.

At block 204, the system determines a group of users based on text in the message. For example, in various embodiments, one or more key words in the text indicate the group of users. In various embodiments, the one or more key words indicate a topic, where users in the group of users have expertise on the topic. The system analyzes the text within the message for keywords and cognitively determines significant or important terms that indicate the group of users. For example, if a user is looking for support for their laptop computer (e.g., experiencing a networking issue, etc.), the system may determine from the keywords (e.g., "laptop," "problem," "network," "help," etc.) the other users (e.g., network technicians, etc.) who would be best to contact. In various embodiments, this initial group of users at least has expertise on the topic. In some embodiments, certain messages may be initially stored in certain repositories associated with certain topics (e.g., engineering, sales, etc.). As such, the system may determine the group of users based on the repository where the message is initially stored. These techniques are beneficial in that they eliminate users who don't have expertise on the topic.

In some embodiments, the system may enable the user to drag a user-selected community (e.g., an icon representing a group of users) into a message. The system may analyze the message (e.g., look at key words in the message indicating a topic, etc.) in order to determine the group of users. Based on the analysis, the system may determine the group of users based at least in part on the text in the message in light of the user-selected community.

At block 206, the system obtains a collaboration history associated with the group of users, wherein the collaboration history includes collaboration statistics. As described in more detail below, the system uses this collaboration history to determine an optimum subgroup of users who have a proven track record of working well together in forums.

In various embodiments, the system obtains the collaboration history, which includes past/historical data. For example, the collaboration history may include forum posts, previous messages or email chains, email domains, user information, etc. The system determines which users have been active in the collaboration environment with regard to the topic determined from the message. The system determines collaboration statistics, which may include a number of message or email exchanges that the each user has sent, received, responded to, been referenced within, etc., with regard to the topic in question. The system determines the frequency in which each user has been active with each message associated with the topic. For example, the system may determine how often User A responses to messages versus just reading messages, how quickly the user responds, etc. The system may also determine which users engage with other users, which is an indication of how well these users work together.

In various embodiments, the system determines collaboration scores associated with the users in the collaboration environment, where the collaboration scores are based on the collaboration statistics. Example embodiments directed to collaboration scores are described in more detail below.

At block 208, the system determines a subgroup of users from the group of users based on the collaboration statistics to send notifications. In various embodiments, the collaboration statistics indicate a level of collaboration activity that meets one or more predetermined collaboration requirements. As indicated above, the system determines the optimum subgroup (e.g., User A, User B, etc.) of the larger group of users (e.g., network technicians), where the users in this subgroup have proven to work well together in the past and/or interact well in forums. Some users may have high collaboration scores, and the system flags such users as candidates for subgroups. Because users of a subgroup have higher collaboration scores, these users are likely to respond and to be more interactive and helpful than others in the bigger group of users.

In some embodiments, the system determines an initial subgroup of user to contact (e.g., send notifications). After some initial email exchanges, the system may determine other users to contact. Such a determination may be based at least in part on the collaboration statistics or based in part on temporal or real-time changes in the level of collaboration of specific users or subgroup of users. For example, some users may prove to be more interactive at the beginning of a message string. Other users may prove to be less interactive at the beginning of a given message string, but more interactive in the middle of a given discussion (e.g., message string, etc.). Yet, some users may prove to be more interactive when certain other users are already active in a given discussion. Yet, some users may prove to be less interactive when certain other users are active in a given discussion. The system determines this information from the collaboration statistics.

For example, if there is a discussion on Topic A, after 2-3 email exchanges involving User 5, the system may add User 17 to the subgroup after two weeks of interaction in order to maintain the highest level of collaboration. The system may observe from the collaboration statistics that User 17 typically becomes active after two weeks of a given interaction and more so when user 5 is already active in the interaction. As such, the system may automatically change the users on the distribution list by sending a notification to User 17, or copying or blank copying User 17.

In some embodiments, the system determines the user(s) who may be less helpful and/or discourage optimum, healthy activity in the collaboration environment. For example, there may be one or more users who do not work well with others or who are not helpful in assisting others. Their behavior and participation may tend to cause lower levels of activity on a given topic. The system detects such lower levels of activity based on the collaboration statistics associated with certain users. In other words, the collaboration scores associated with some users may be low. The system might filter users with collaboration scores that fall below a predefined collaboration threshold. As such, the system would not include certain users from certain subgroups based on the collaboration statistics.

Example collaboration information, including collaboration statistics and potential subgroups are described in more detail below.

At block 210, the system sends notifications to users in the subgroup of users. In various embodiments, the notifications may be emails or messages to the users in the subgroup to check a particular communication channel or forum. Notifications may be audible alerts or visual alters. Notifications may be daily digests or summaries of what has occurred in a particular communication channel or forum. In various embodiments, the notifications invite the users of the subgroup to respond to the message. It is optimal to send notifications to the subgroup of users rather than the entire group of users, as the subgroup has proven to work well together based on the collaboration statistics. The end result is that collaboration activities take much less time for individual users, which greatly benefits the collaboration community of users.

Another benefit of the embodiments described herein is that fewer notifications and fewer message exchanges are generated. As such, the lower number of messages require much less email server storage, as there would be fewer email chains being sent on the system. Also, there would be fewer messages needlessly sent. Also, the subgroup of users is proven to already work well together and would thus be the most efficient group to involve in the given collaboration.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

As indicated above, in various embodiments, the system computes a collaboration score for each user based on collaboration statistics and based on one or more predetermined collaboration requirements. In various embodiments, the collaboration score is based on various collaboration statistics for the specific user as the collaboration statistics relate to the given and/or to the proposed subgroup. The following description provides example embodiments directed to various predetermined collaboration requirements.

FIG. 4 is a table 400 showing example collaboration information, according to some embodiments. The system may use content analyzer 302 to generate table 400, and table 400 may be stored at database 106 or another suitable storage location.

In various embodiments, the information in table 400 facilitates the system in understanding the behaviors, tone, and mood of individuals in a group of users. As such, the system determines an optimal subgroup that works well together.

In this particular example, the conversation topic is "computer monitor." For example, a user may have problems with his or her computer monitor. Based on key words of a message requesting assistance, they system may determine the classification of "support." In various embodiments, multiple communication exchanges between two or more users may be in various forms. For example, communication exchanges may be in the form of an email conversation or email string, a chat conversation, etc. The term "conversation" may refer to emails and/or chats.

In some embodiments, one or more predetermined collaboration requirements may require that the collaboration statistics indicate that the users in the subgroup interact well together. For example, based on the collaboration history and collaboration statistics (e.g., associated with "computer monitor" and "support" and other key words), the system may determine that User 1, User 23, and User 67 are good candidates for a subgroup. For example, these users may have a track record of engaging with each other on the topic. Such users are generally approachable, happier, and have nice dispositions. These personal traits tend to reflect well on activity associated with these users. For example, the activity level of a conversation may go up when one or more of these users are active in the collaboration environment. The system may determine that this particular subgroup has collaboration strength of 96%. In some embodiments, the system may compare this subgroup to other candidate subgroups. The system may rank subgroups against each other and select the subgroup with the highest collaboration strength.

For example, in some embodiments, one or more predetermined collaboration requirements may require that the collaboration statistics indicate that historic participation of the users in the subgroup results in positive collaboration activity. For example, in some embodiments, the system may qualify each user to be a part of a subgroup based at least in part on a threshold number of posts or a threshold historical frequency of posting on a given topic. In some embodiments, the system may list the sources checked such as a rational team concert (RTC) repository, stack exchange, Gmail, etc. in order to determine the activity of each user in different forums. In some embodiments, the system may determine a user for access control (e.g., User 23 being primary).

In some embodiments, one or more predetermined collaboration requirements may require that the collaboration statistics indicate that historic participation of the users in the subgroup results in increased collaboration activity.

In various embodiments, the system determines a notification priority based at least in part on the collaboration statistics. The system then sends the notification to the users in the subgroup in an order that is based at least in part on the notification priority. For example, the system may first send a notification to User 23, and then send a notification to User 67, etc.). The system may include an initial introduction message (e.g., "I see you guys work really well together . . . "). They system may suggest a best collaboration time (e.g., 8 am-11 am, etc.). The system may derive such collaboration information from the collaboration statistics.

In various embodiments, the system may changes at least some of the users in the subgroup based at least in part on the one or more collaboration requirements. In some embodiments, the system may modify the subgroup of users based at least in part on the meeting the collaboration requirements.

Figure 5:
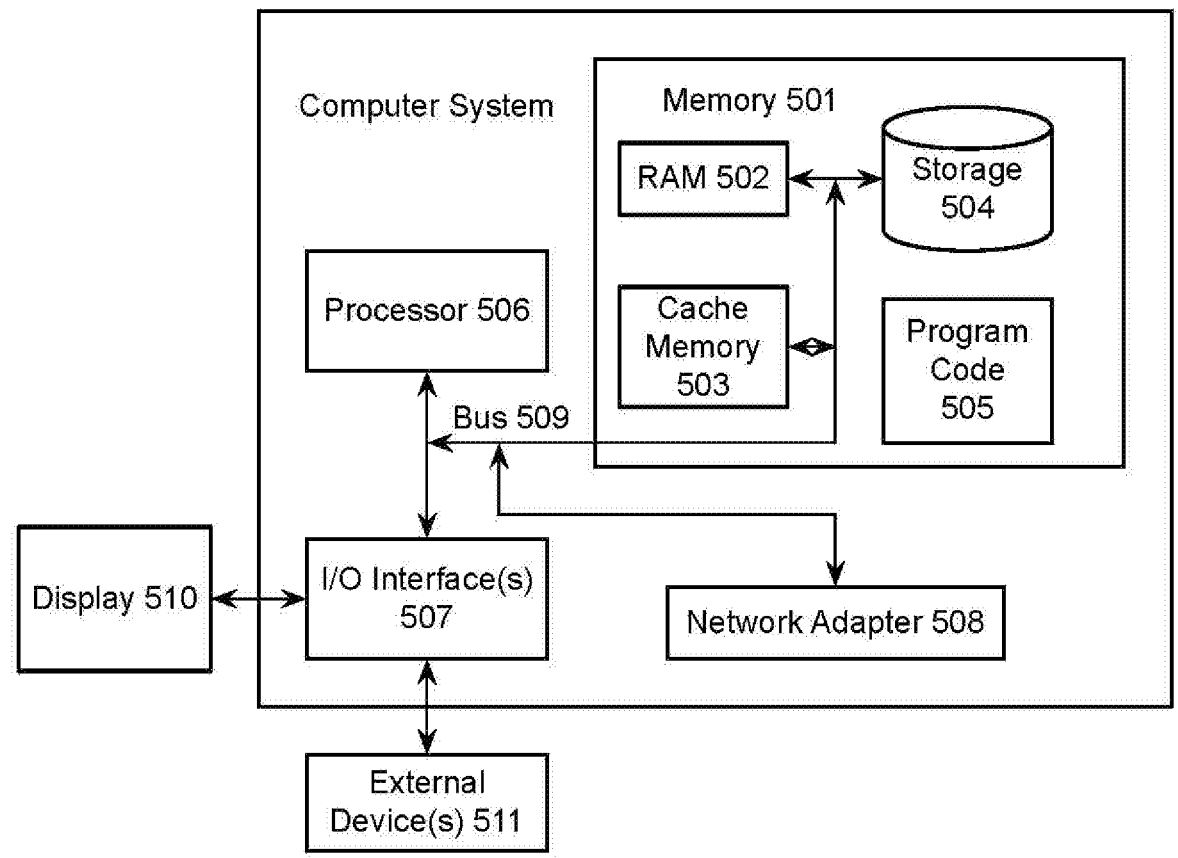
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
at least one processor and a computer readable storage medium having program instructions embodied therewith, the program instructions executable by the at least one processor to cause the at least one processor to perform operations comprising:
receiving a message in a collaboration environment, wherein the message is received via a repository of messages in which the message was initially stored, and wherein the repository of messages is associated with a topic;
determining a group of users based on text in the message and the repository of messages, wherein one or more key words in the text indicate the group of users, wherein the one or more key words indicate the topic, and wherein users in the group of users have expertise on the topic;
obtaining a collaboration history associated with each user of the group of users, wherein the collaboration history comprises collaboration statistics of each user;
enabling a first user to drag an icon representing the group of users into the message;
determining a collaboration score for each user of the group of users based on respective collaboration statistics of each user;
filtering out users of the group of users whose respective collaboration score is below a predefined collaboration threshold;
determining a subgroup of users from the group of users based on the icon and the collaboration statistics of each user in the subgroup, wherein the collaboration statistics indicate a level of collaboration activity that meets one or more predetermined collaboration requirements, and wherein the predetermined collaboration requirements require that the collaboration statistics indicate that historic participation of the users in the subgroup results in increased collaboration activity, and wherein the users in the subgroup are qualified based at least in part on a threshold historical frequency of posting on the topic;
determining a collaboration strength of the subgroup based on the collaboration statistics of each user in the subgroup;
sending notifications to a first user and subsequently to a second user in the subgroup of users based on the collaboration statistics, wherein the collaboration statistics indicate that the level of collaboration activity of the second user increases when the first user is already active, and wherein the notifications invite the first user and the second user to respond to the message, and wherein the notifications comprise a summary of what has occurred in the collaboration environment, an initial introduction message, and a best collaboration time suggestion;

changing at least some of the users in the subgroup based at least in part on the one or more predetermined collaboration requirements;

comparing subgroups from the group of users against each other based on their respective collaboration strengths;

ranking the subgroups against each other based on their respective collaboration strengths; and selecting the subgroup of users based on the subgroup of users having a highest collaboration strength of the subgroups.

2. The system of claim 1, wherein the predetermined collaboration requirements require that the collaboration statistics indicate that the users in the subgroup interact well together.

3. The system of claim 1, wherein the predetermined collaboration requirements require that the collaboration statistics indicate that historic participation of the users in the subgroup results in positive collaboration activity.

4. The system of claim 1, wherein the at least one processor further performs operations comprising:

determining the subgroup of users from the group of users further based on temporal changes in the level of collaboration of the subgroup of users.

5. The system of claim 1, wherein the at least one processor further performs operations comprising:

determining a notification priority based at least in part on the collaboration statistics; and sending the notification to the users in the subgroup in an order that is based at least in part on the notification priority.

6. A computer program product comprising a non-transitory computer readable storage medium having program instructions embodied therewith, the program instructions executable by at least one processor to cause the at least one processor to perform operations comprising:

receiving a message in a collaboration environment, wherein the message is received via a repository of messages in which the message was initially stored, and wherein the repository of messages is associated with a topic;

determining a group of users based on text in the message and the repository of messages, wherein one or more key words in the text indicate the group of users, wherein the one or more key words indicate the topic, and wherein users in the group of users have expertise on the topic;

obtaining a collaboration history associated with each user of the group of users, wherein the collaboration history comprises collaboration statistics of each user;

enabling a first user to drag an icon representing the group of users into the message;

determining a collaboration score for each user of the group of users based on respective collaboration statistics of each user;

filtering out users of the group of users whose respective collaboration score is below a predefined collaboration threshold;

determining a subgroup of users from the group of users based on the icon and the collaboration statistics of each user in the subgroup, wherein the collaboration statistics indicate a level of collaboration activity that meets one or more predetermined collaboration requirements, and wherein the predetermined collaboration requirements require that the collaboration statistics indicate that historic participation of the users in the subgroup results in increased collaboration activity, and wherein the users in the subgroup are qualified based at least in part on a threshold historical frequency of posting on the topic;

determining a collaboration strength of the subgroup based on the collaboration statistics of each user in the subgroup;

sending notifications to a first user and subsequently to a second user in the subgroup of users based on the collaboration statistics, wherein the collaboration statistics indicate that the level of collaboration activity of the second user increases when the first user is already active, and wherein the notifications invite the first user and the second user to respond to the message, and wherein the notifications comprise a summary of what has occurred in the collaboration environment, an initial introduction message, and a best collaboration time suggestion;

changing at least some of the users in the subgroup based at least in part on the one or more predetermined collaboration requirements;

comparing subgroups from the group of users against each other based on their respective collaboration strengths;

ranking the subgroups against each other based on their respective collaboration strengths; and selecting the subgroup of users based on the subgroup of users having a highest collaboration strength of the subgroups.

7. The computer program product of claim 6, wherein the predetermined collaboration requirements require that the collaboration statistics indicate that the users in the subgroup interact well together.

8. The computer program product of claim 6, wherein the predetermined collaboration requirements require that the collaboration statistics indicate that historic participation of the users in the subgroup results in positive collaboration activity.

9. The computer program product of claim 6, wherein the at least one processor further performs operations comprising:

determining the subgroup of users from the group of users further based on temporal changes in the level of collaboration of the subgroup of users.

10. The computer program product of claim 6, wherein the at least one processor further performs operations comprising:

determining a notification priority based at least in part on the collaboration statistics; and sending the notification to the users in the subgroup in an order that is based at least in part on the notification priority.

11. A computer-implemented method for facilitating communication in a collaboration environment, the method comprising:

receiving a message in a collaboration environment, wherein the message is received via a repository of messages in which the message was initially stored, and wherein the repository of messages is associated with a topic;

determining a group of users based on text in the message and the repository of messages, wherein one or more key words in the text indicate the group of users, wherein the one or more key words indicate the topic, and wherein users in the group of users have expertise on the topic;

obtaining a collaboration history associated with each user of the group of users, wherein the collaboration history comprises collaboration statistics of each user;

enabling a first user to drag an icon representing the group of users into the message;

determining a collaboration score for each user of the group of users based on respective collaboration statistics of each user;

filtering out users of the group of users whose respective collaboration score is below a predefined collaboration threshold;

determining a subgroup of users from the group of users based on the icon and the collaboration statistics of each user in the subgroup, wherein the collaboration statistics indicate a level of collaboration activity that meets one or more predetermined collaboration requirements, and wherein the predetermined collaboration requirements require that the collaboration statistics indicate that historic participation of the users in the subgroup results in increased collaboration activity, and wherein the users in the subgroup are qualified based at least in part on a threshold historical frequency of posting on the topic;

determining a collaboration strength of the subgroup based on the collaboration statistics of each user in the subgroup;

sending notifications to a first user and subsequently to a second user in the subgroup of users based on the collaboration statistics, wherein the collaboration statistics indicate that the level of collaboration activity of the second user increases when the first user is already active, and wherein the notifications invite the first user and the second user to respond to the message, and wherein the notifications comprise a summary of what has occurred in the collaboration environment, an initial introduction message, and a best collaboration time suggestion;

changing at least some of the users in the subgroup based at least in part on the one or more predetermined collaboration requirements;

comparing subgroups from the group of users against each other based on their respective collaboration strengths;

ranking the subgroups against each other based on their respective collaboration strengths; and selecting the subgroup of users based on the subgroup of users having a highest collaboration strength of the subgroups.

12. The computer-implemented method of claim 11, wherein the predetermined collaboration requirements require that the collaboration statistics indicate that the users in the subgroup interact well together.

13. The computer-implemented method of claim 11, wherein the predetermined collaboration requirements require that the collaboration statistics indicate that historic participation of the users in the subgroup results in positive collaboration activity.

14. The computer-implemented method of claim 11, further comprising:
    determining the subgroup of users from the group of users further based on temporal changes in the level of collaboration of the subgroup of users.

15. The computer-implemented method of claim 11, further comprising: determining a notification priority based at least in part on the collaboration statistics; and sending the notification to the users in the subgroup in an order that is based at least in part on the notification priority.

* * * * *